United States Patent
Liu et al.

(10) Patent No.: US 10,961,391 B2
(45) Date of Patent: Mar. 30, 2021

(54) CURABLE ORGANOPOLYSILOXANE COMPOSITION CONTAINING DYNAMIC COVALENT POLYSILOXANE

(71) Applicant: AVANTOR PERFORMANCE MATERIALS, LLC, Center Valley, PA (US)

(72) Inventors: Jianhua Liu, Camarillo, CA (US); James Roque Darlucio, Port Hueneme, CA (US); James Michael Lambert, Glen Allen, VA (US)

(73) Assignee: Avantor Performance Materials, LLC, Center Valley, PA (US)

( * ) Notice: Subject to any disclaimer, the term of this patent is extended or adjusted under 35 U.S.C. 154(b) by 0 days.

(21) Appl. No.: 16/628,872

(22) PCT Filed: Jul. 9, 2018

(86) PCT No.: PCT/US2018/041226
§ 371 (c)(1),
(2) Date: Jan. 6, 2020

(87) PCT Pub. No.: WO2019/018147
PCT Pub. Date: Jan. 24, 2019

(65) Prior Publication Data
US 2020/0239639 A1 Jul. 30, 2020

Related U.S. Application Data

(60) Provisional application No. 62/534,406, filed on Jul. 19, 2017.

(51) Int. Cl.
| | | |
|---|---|---|
| *C08L 83/04* | (2006.01) | |
| *C08G 77/56* | (2006.01) | |
| *C08J 3/24* | (2006.01) | |
| *B01J 27/13* | (2006.01) | |
| *B01J 31/16* | (2006.01) | |
| *C08G 77/08* | (2006.01) | |
| *C08G 77/12* | (2006.01) | |
| *C08G 77/20* | (2006.01) | |

(52) U.S. Cl.
CPC ............... *C08L 83/04* (2013.01); *B01J 27/13* (2013.01); *B01J 31/1608* (2013.01); *C08G 77/08* (2013.01); *C08G 77/12* (2013.01); *C08G 77/20* (2013.01); *C08J 3/243* (2013.01); *B01J 2531/828* (2013.01); *C08G 77/56* (2013.01)

(58) Field of Classification Search
CPC ............ C08L 83/04; C08L 83/14; C08J 3/243
See application file for complete search history.

(56) References Cited

U.S. PATENT DOCUMENTS

| | | | |
|---|---|---|---|
| 2008/0293878 A1* | 11/2008 | Funk ................. | C08L 83/04 524/588 |
| 2016/0130405 A1* | 5/2016 | Thuresson .......... | C08K 3/38 523/219 |
| 2017/0306150 A1* | 10/2017 | Nishida ............... | C08G 77/12 |
| 2019/0315934 A1* | 10/2019 | Zelisko .............. | B29C 73/163 |

OTHER PUBLICATIONS

Machine translation into English of CN 108610486 (no date).*
Abstract for CN 108610486 (Oct. 2018).*

* cited by examiner

*Primary Examiner* — Marc S Zimmer
(74) *Attorney, Agent, or Firm* — Hoffmann & Baron, LLP

(57) ABSTRACT

A curable organopolysiloxane composition containing dynamic covalent organopolysiloxanes which yields, upon cure, a silicone rubber having adaptive elastomeric and viscous characteristics is claimed. The silicone may be an elastomer or foam. A method of making the silicone rubber and a shaped article made of the cured adaptive viscoelastic silicone rubber composition are also claimed.

22 Claims, 1 Drawing Sheet

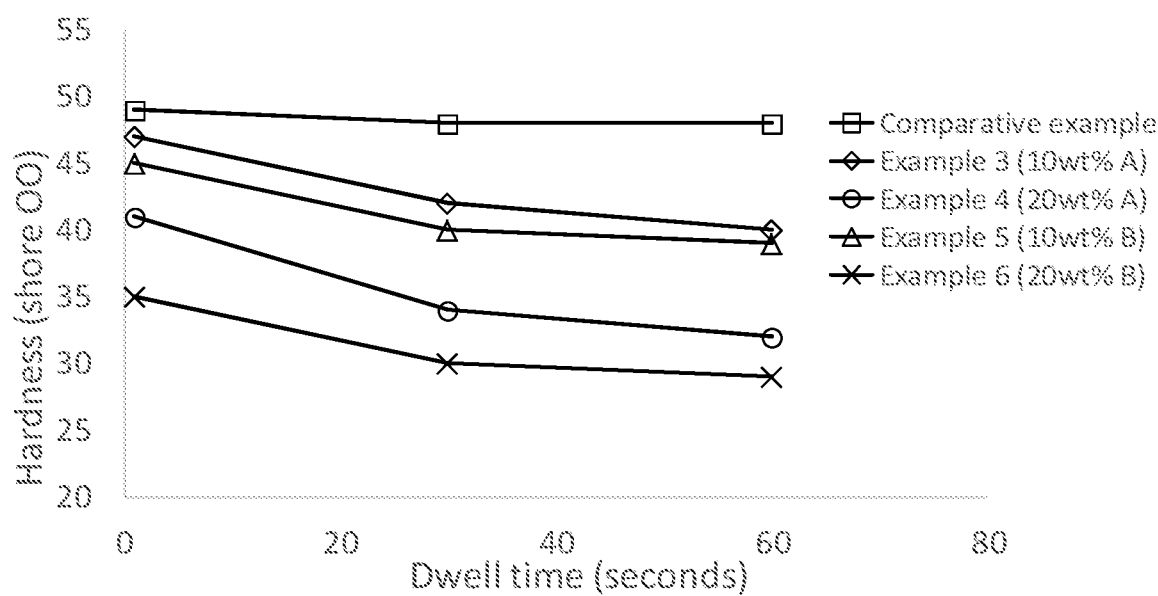

CURABLE ORGANOPOLYSILOXANE COMPOSITION CONTAINING DYNAMIC COVALENT POLYSILOXANE

CROSS-REFERENCE TO RELATED APPLICATIONS

This application is the U.S. National Phase of, and Applicant claims priority from, International Patent Application Number PCT/US2018/041226 filed 9 Jul. 2018, which claims priority from 62/534,406 filed 19 Jul. 2017, each of which is incorporated herein by reference.

BACKGROUND OF THE INVENTION

Dynamic covalent polymers, which are constructed by dynamic covalent bonds, have attracted much attention due to their unique chemical, physical and mechanical properties. See Accounts of Chemical Research 2017, 50, 376-386. Different from classic covalent bonds which are static and irreversible, dynamic covalent bonds are reversible and responsive, therefore rendering the dynamic covalent polymers with adaptive properties such as self-healing, stimuli-responsiveness, shape memory, and tunable mechanical and viscoelastic character. See Macromolecules 2015, 48, 2098-2106. Typical dynamic covalent bonds, such as imines, acyl hydrazones, boronate ester and alkoxy amines, are reported and utilized to construct different types of dynamic covalent polymers. See Journal of Polymer Science, Part A: Polymer Chemistry 2016, 54, 3551-3557.

Silicone rubber compositions have massive applications in industry, especially in the areas of healthcare, medical implants, electronics, aerospace and defense due to their merits such as biocompatibility, thermal and chemical stability, flame retardancy, and low temperature flexibility. These merits make silicone rubber distinctive from carbon-based rubbers, and are mainly derived from the chemical structure of the organopolysiloxane backbone and the cross-linking network built thereof in silicone rubbers. Similarly, compared to dynamic covalent polymers with carbon-based backbones, dynamic covalent polymers with an organopolysiloxane backbone have both the above-mentioned adaptive properties as well as excellent chemical and physical properties.

Incorporating dynamic covalent organopolysiloxanes into silicone rubber compositions provides new compositions with unique advantages. First, they are still all-silicone-based compositions which maintain the merits of silicone rubbers. Second, the new composition has two primary components. One is the silicone rubber component which provides basic physical properties such as elasticity, hardness, and tensility; the other is the dynamic covalent siloxane polymers which offer adaptive properties such as self-healing, stimuli-responsiveness, and tunable viscous character. Unique properties such as adaptive viscoelasticity, which means they can relax at tunable time periods to eliminate imposed stress and impacts, can be achieved by tuning the molecular structures and ratios of silicone rubber component and dynamic covalent organopolysiloxanes, resulting in the composition being a good candidate as an energy absorbing and impact resistance material, especially when used in healthcare and medical implant applications. Some commercially available versions of similar materials are hydrocarbon-based products which lack biocompatibility and flame retardant properties. These products are not suitable to be used as medical devices or implants where biocompatibility is required, or in high heat conditions where fire resistance and the ability to limit the spread of smoke and fire are required.

Accordingly, there is a need for new silicone rubbers incorporating dynamic covalent organopolysiloxanes, that can be easily processed and are adjustable, biocompatible, flame retardant, and possess adaptive viscoelasticity.

SUMMARY OF THE INVENTION

The inventors have discovered a new viscoelastic silicone rubber that is easily prepared and possesses biocompatibility, flame retardancy, energy absorption, impact resistance, and shape memory, and is self-adhering.

A curable organopolysiloxane composition containing dynamic covalent organopolysiloxanes which yields, upon cure, a silicone having adaptive elastomeric and viscous characteristics is claimed. The curable organopolysiloxane composition includes: (a) alkenyl-containing organopolysiloxanes having an average of at least two alkenyl radicals per molecule; (b) hydride-containing organopolysiloxanes having an average of at least two silicon-bonded hydrogen atoms per molecule; (c) a dynamic covalent organopolysiloxane, wherein the dynamic covalent organopolysiloxane is an organopolysiloxane having dynamic covalent bonds; and (d) a metal complex catalyst.

Preferably, the alkenyl-containing organopolysiloxanes and hydride-containing organopolysiloxanes independently comprise a total of 1-10,000 units of formulas I, II, and III below:

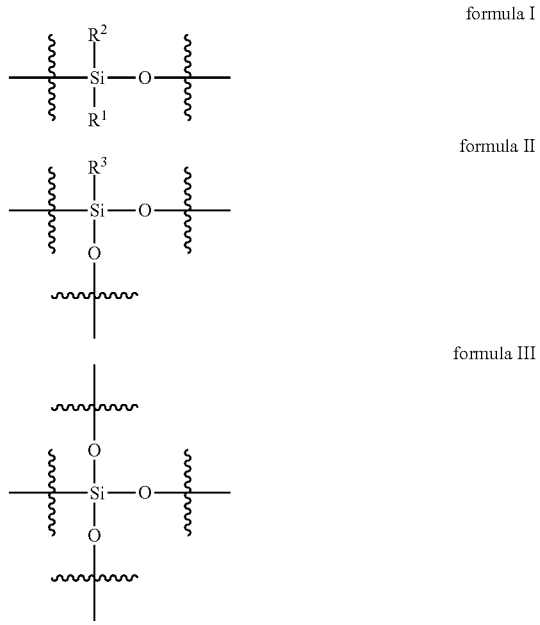

In formulas I, II, and III, $R^1$, $R^2$, and $R^3$ independently represent alkyl, cycloalkyl, or phenyl; alkyl groups are branched or unbranched, saturated or unsaturated, and have 1-12 carbon atoms in their longest chain; cycloalkyl groups are carbocyclic, unfused, non-aromatic ring systems having a total of 5-12 rings members; each alkyl, cycloalkyl, or phenyl group may be unsubstituted or substituted with one or more substituent at any position; alkyl substituents are halo, cycloalkyl, phenyl, hydroxyl, and ether; cycloalkyl substituents are halo, alkyl, alkoxy, phenyl, and hydroxyl; and phenyl substituents are alkyl and alkoxy.

The alkenyl-containing organopolysiloxanes are alkenyl-terminated organopolysiloxanes, alkenyl-pendant organopolysiloxanes, or combinations thereof. The hydride-containing organopolysiloxanes are hydride-terminated organopolysiloxanes, hydride-pendant organopolysiloxanes, or combinations thereof.

The dilatant material includes imines, acyl hydrazones, boronate esters, alkoxy amines, and combinations thereof. The metal complex catalyst is preferably selected from the group consisting of platinum (Pt), ruthenium (Ru), rhodium (Rh), palladium (Pd), iridium (Ir), and combinations thereof. The most preferred metal complex catalyst is a Pt complex such as Karstedt's catalyst or Speier's catalyst.

The composition may further include fillers and treating agents. Other optional ingredients include blowing agents, surfactants, or combinations thereof.

The alkenyl-containing organopolysiloxanes and hydride-containing organopolysiloxanes are preferably not silanol-terminated.

Another aspect of the invention relates to a method of making a silicone rubber composition including the steps of: combining the curable organopolysiloxane composition described above and curing the mixture under conditions sufficient to form a silicone rubber composition.

The preferred curing temperature is about 70° C. to about 150° C. In a preferred embodiment, prior to the curing step, the mixture is placed a mold.

Another aspect of the invention relates to a shaped article comprising a cured silicone rubber composition including the reaction product of (a) alkenyl-containing organopolysiloxanes having an average of at least two alkenyl radicals per molecule; (b) hydride-containing organopolysiloxanes having an average of at least two silicon-bonded hydrogen atoms per molecule; (c) a dynamic covalent organopolysiloxane, wherein the dynamic covalent organopolysiloxane is an organopolysiloxane having dynamic covalent bonds; and (d) a metal complex catalyst; wherein: the alkenyl-containing organopolysiloxanes and hydride-containing organopolysiloxanes independently comprise a total of 1-10,000 units of formulas I, II, and III below:

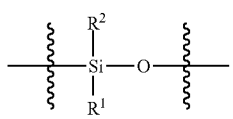

formula I

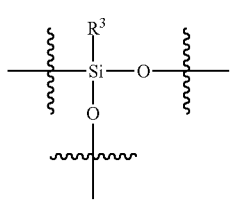

formula II

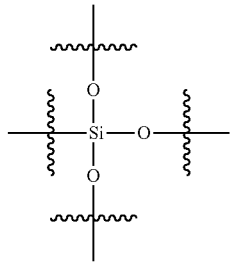

formula III and, $R^1$, $R^2$, and $R^3$ independently represent alkyl, cycloalkyl, or phenyl; alkyl groups are branched or unbranched, saturated or unsaturated, and have 1-12 carbon atoms in their longest chain; cycloalkyl groups are carbocyclic, unfused, non-aromatic ring systems having a total of 5-12 rings members; each alkyl, cycloalkyl, or phenyl group may be unsubstituted or substituted with one or more substituent at any position; alkyl substituents are halo, cycloalkyl, phenyl, hydroxyl, and ether; cycloalkyl substituents are halo, alkyl, alkoxy, phenyl, and hydroxyl; and phenyl substituents are alkyl and alkoxy.

DESCRIPTION OF THE DRAWING

FIG. 1 is a graph showing a comparison of the Type 00 durometer hardness of various curable dimethyl silicone compositions (y-axis) versus dwell time in seconds (x-axis). The compositions compared include a comparative example (Control MED 4901 prepared in Example 2), 10 wt. % dynamic covalent polydimethylsiloxane A in Example 3, 20 wt. % dynamic covalent polydimethylsiloxane A in Example 4, 10 wt. % dynamic covalent polydimethylsiloxane B in Example 5, and 20 wt. % dynamic covalent polydimethylsiloxane B in Example 6. The data points for the FIGURE are provided in Table 1, Example 6.

DETAILED DESCRIPTION

One aspect of the invention relates to a curable organopolysiloxane composition which yields, upon cure, a silicone rubber having adaptive elastomeric and viscous characteristics. The silicone may be in the form of an elastomer or a foam.

The curable organopolysiloxane composition includes the following reaction ingredients: (a) alkenyl-containing organopolysiloxanes having an average of at least two alkenyl radicals per molecule; (b) hydride-containing organopolysiloxanes having an average of at least two silicon bonded hydrogen atoms per molecule; (c) a dynamic covalent organopolysiloxane; and (d) a metal complex catalyst.

In another embodiment, the curable organopolysiloxane composition includes the following reaction ingredients: (a) alkenyl-containing organopolysiloxanes having an average of at least two alkenyl radicals per molecule; (b) hydride-containing organopolysiloxanes having an average of at least two silicon bonded hydrogen atoms per molecule; (c) a dilatant material; and (d) a metal complex catalyst.

The alkenyl-containing and hydride-containing organopolysiloxanes may be linear or branched. A linear organopolysiloxane may contain 1-10,000 units of formula I below.

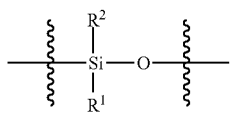

A branched organopolysiloxane may contain a total of 1-10,000 units of formulas I, II, and III, wherein at least one unit is of formula II or III below:

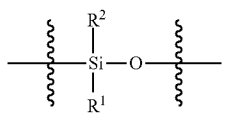

formula I

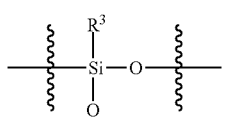

formula II

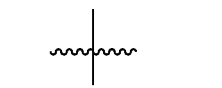

formula III

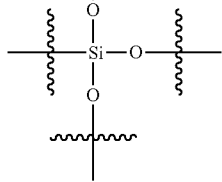

Units refer to the monomers that make up the organopolysiloxanes. The branched organopolysiloxanes may contain anywhere from 1 to 10,000 total units of formulas I, II, and III. The units may be combined and arranged in any chemically-stable fashion to form branched organopolysiloxanes.

For reaction ingredient (a), the alkenyl-containing organopolysiloxanes have an average of at least two alkenyl radicals per molecule. The alkenyl radicals may be represented by the formula $-(R^4)_xCH=CH_2$, wherein $R^4$ is a $C_{1-12}$ alkyl and x is 0 or 1. The preferred alkenyl is a vinyl group (wherein x=0). The average is the total number of alkenyl radicals in all of the alkenyl-containing organopolysiloxanes divided by the total number of alkenyl-containing organopolysiloxanes.

Preferred examples of $R^1$, $R^2$, and $R^3$ radicals include alkyl groups, preferably $CH_3$, $C_2H_5$ and $C_6H_{13}$, cycloaliphatic groups such as cyclohexyl, aryl groups such as phenyl and xylyl. Preferred halogenated hydrocarbon radicals have the formula $C_nF_{2n+1}CH_2CH_2-$, where n is from 1 to 10, examples such as $CF_3CH_2CH_2-$, $C_4F_9CH_2CH_2-$, and $C_6F_{13}CH_2CH_2-$. A preferred radical is the 3,3,3-trifluoropropyl group. Particularly preferred radicals include methyl, phenyl, and 3,3,3-trifluoropropyl.

Furthermore, the linear and branched organopolysiloxanes described above may be alkenyl-terminated, alkenyl-pendant, or combinations thereof. Some examples of both alkenyl-terminated organopolysiloxanes and combined alkenyl-terminated and alkenyl-pendant organopolysiloxanes are shown below.

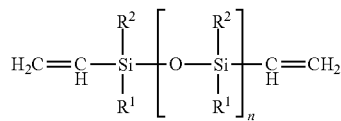

Alkenyl-terminated linear organopolysiloxane, wherein n=1-10,000 units

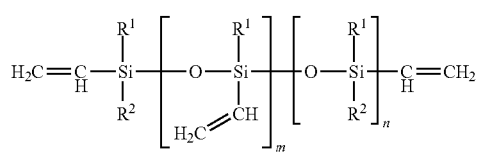

Alkenyl-pendant and alkenyl-terminated branched organopolysiloxane, wherein m>0 and m+n=1-10,000 units

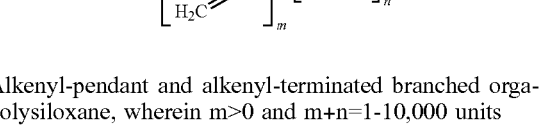

Alkenyl-terminated branched organopolysiloxane, wherein n=1-10,000 units

For reaction ingredient (b), the hydride-containing organopolysiloxanes having an average of at least two silicon-bonded hydrogen atoms per molecule, the linear and branched organopolysiloxanes described above may be hydride-terminated, hydride-pendant, or combinations thereof. The average is the total number of silicon-bonded hydrogen atoms in all of the hydride-containing organopolysiloxanes divided by the total number of hydride-containing organopolysiloxanes.

Some examples of both hydride-terminated organopolysiloxanes and combined hydride-terminated and hydride-pendant organopolysiloxanes are shown below.

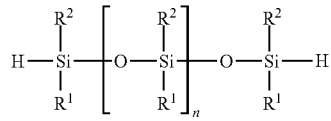

Hydride-terminated linear organopolysiloxane, wherein n=1-10,000 units

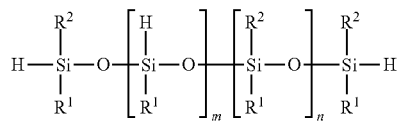

Hydride-pendant and hydride-terminated linear organopolysiloxane, wherein m>0 and m+n=1-10,000 units In the formulas above, $R^1$, $R^2$, and $R^3$ independently represent alkyl, cycloalkyl, or phenyl. Independently means that $R^1$, $R^2$, $R^3$ may be the same or different within a unit and for each unit. For example, $R^1$ may be methyl, $R^2$ may be phenyl, and $R^3$ may be ethyl in one unit and $R^1$ and $R^2$ may be phenyl and $R^3$ may be methyl in another unit.

Alkyl groups are branched or unbranched, saturated or unsaturated, and have 1-12 carbon atoms in their longest chain. Accordingly, the alkyl groups may include single, double, or triple bonds.

Some examples of suitable straight-chained, saturated alkyl groups include methyl, ethyl, n-propyl, n-butyl, n-pentyl, n-hexyl groups and dodecyl. Preferred straight chain, saturated alkyl groups include methyl and ethyl.

Some examples of suitable branched, saturated alkyl groups include iso-propyl, iso-butyl, sec-butyl, t-butyl, 1-methylbutyl, 2-methylbutyl, 3-methylbutyl (isopentyl), 1,1-dimethylpropyl, 1,2-dimethylpropyl, 2,2-dimethylpropyl (neopentyl), 1-methylpentyl, 2-methylpentyl, 3-methylpentyl, 4-methylpentyl groups, and 2-methyl, 5-ethyldecyl. Preferred branched, saturated alkyl groups include iso-propyl and t-butyl.

Some examples of unsaturated alkyl groups include ethenyl, ethynyl, propenyl, propargyl, isopropenyl, crotyl, 1-hexenyl, and 1-octenyl.

Cycloalkyl groups are carbocyclic, unfused, non-aromatic ring systems having a total of 5-12 ring members. Some examples of carbocyclic alkyl groups include cyclobutanyl, cyclopentanyl, cyclohexanyl, and cycloheptanyl.

Each alkyl, cycloalkyl, or phenyl group may be unsubstituted or substituted with one or more substituent at any position. Alkyl substituents are halo, cycloalkyl, phenyl, hydroxyl, and ether. If the alkyl substituent is an ether, then one of the carbon atoms within the alkyl chain is replaced with an —O— group, so the —O— group is attached to carbon atoms on both sides (i.e., —C—O—C—). Cycloalkyl substituents are halo, alkyl, alkoxy, phenyl, and hydroxyl. Phenyl substituents are alkyl and alkoxy. Alkoxy groups are represented by —OR$^4$, wherein $R^4$ is a $C_{1-12}$ alkyl.

Preferred examples of $R^1$, $R^2$, and $R^3$ radicals include alkyl groups, preferably $CH_3$, $C_2H_5$ and $C_6H_{13}$, cycloaliphatic groups such as cyclohexyl, aryl groups such as phenyl and xylyl. Preferred halogenated hydrocarbon radicals have the formula $C_nF_{2n+1}CH_2CH_2$—, where n is from 1 to 10, examples such as $CF_3CH_2CH_2$—, $C_4F_9CH_2CH_2$—, and $C_6F_{13}CH_2CH_2$—. A preferred radical is the 3,3,3-trifluoropropyl group. Particularly preferred radicals include methyl, phenyl, and 3,3,3-trifluoropropyl.

Reaction ingredient (a) has a viscosity within a range of about 1 to 1,000,000 centipoise (cP) at 25° C., preferably from about 1000 to 100,000 cP and more preferably from about 5,000 to 50,000 cP at 25° C. Reaction ingredient (b) has a viscosity within a range of about 1 to 100,000 centipoise (cP) at 25° C., preferably from about 1 to 5,000 cP and more preferably from about 5 to 1,000 cP at 25° C.

The molar ratio of silicon-bonded hydrogen atoms in reaction ingredients (b) to silicon-bonded alkenyl groups in reaction ingredient (a) is roughly from about 0.3 to 10, preferably from about 0.8 to 6 and more preferably from about 1 to 4.

In one embodiment, when reaction ingredient (c) is a dynamic covalent organopolysiloxane, the dynamic covalent organopolysiloxanes are organopolysiloxanes containing dynamic covalent bonds. Dynamic covalent bonds have the ability to be formed and broken reversibly under equilibrium control, and the exchange should be sufficiently fast meaning a bond life time on a scale of milliseconds to minutes.

Examples of dynamic covalent bonds include, but are not limited to, imines, acyl hydrazones, boronate ester and alkoxy amines, in which boronate ester is preferred. The boronate ester containing dynamic covalent organopolysiloxanes can be prepared by polymerizing hydroxyl-containing organopolysiloxanes with boron-containing compounds. Boronate ester is the preferable dynamic covalent bond to form dynamic covalent organopolysiloxanes by polymerizing hydroxyl-containing organopolysiloxanes with boron-containing compounds. The resulting dynamic covalent organopolysiloxanes can have linear, branched, or cross-linked structures. Polyboroorganosiloxane is an example of a dynamic covalent organopolysiloxane. The hydroxyl group in the organopolysiloxanes can be either silanol, carbinol or a combination thereof. Furthermore, the silanol groups described above may be silanol-terminated, silanol-pendant, or combinations thereof. The carbinol groups described above may be carbinol-terminated, carbinol-pendant, or combinations thereof.

In preferred embodiments, silanol terminated organopolysiloxane is represented by the general formula:

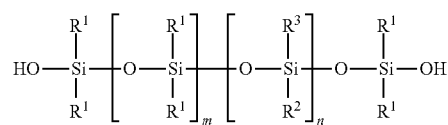

Carbinol terminated organopolysiloxane is represented by the general formula:

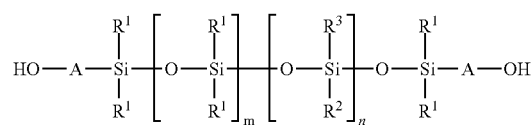

The letter m is zero to 5000, preferably with an average value from 50 to 1000; and the letter n is zero to 5000, preferably with an average value from 20 to 1000.

$R^1$, $R^2$, and $R^3$ independently represent alkyl, cycloalkyl, or phenyl; alkyl groups are branched or unbranched, saturated or unsaturated, and have 1-12 carbon atoms in their longest chain; cycloalkyl groups are carbocyclic, unfused, non-aromatic ring systems having a total of 5-12 ring members; each alkyl, cycloalkyl, or phenyl group may be unsubstituted or substituted with one or more substituent at any position; alkyl substituents are halo, cycloalkyl, phenyl, hydroxyl, and ether; cycloalkyl substituents are halo, alkyl, alkoxy, phenyl, and hydroxyl; and phenyl substituents are alkyl and alkoxy.

Preferred examples include alkyl groups, preferably $CH_3$, $C_2H_5$ and $C_6H_{13}$, cycloaliphatic groups such as cyclohexyl, aryl groups such as phenyl and xylyl. Preferred halogenated hydrocarbon radicals have the formula $C_nF_{2n+1}CH_2CH_2$—, where n is from 1 to 10, examples such as $CF_3CH_2CH_2$—, $C_4F_9CH_2CH_2$—, and $C_6F_{13}CH_2CH_2$—. A preferred radical is the 3,3,3-trifluoropropyl group. Particularly preferred radicals include methyl, phenyl, and 3,3,3-trifluoropropyl.

The spacer A is a residue of

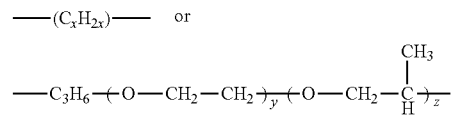

wherein x is an integer from 1 to 20, preferably 6 or 10; and y and z are integers from 0 to 100, wherein y+z≥1 (i.e., both y and z cannot be 0 at the same time).

Some examples of silanol-terminated organopolysiloxanes and carbinol-terminated organopolysiloxanes are shown below.

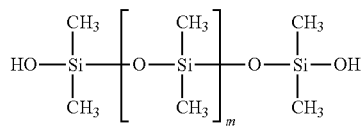

Silanol-terminated dimethylpolysiloxane, wherein m=1-5,000 units

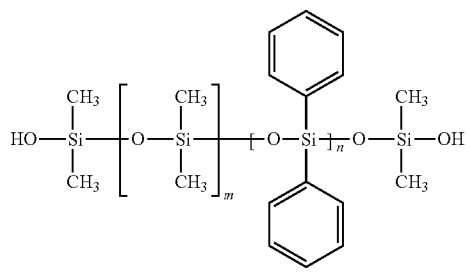

Silanol-terminated dimethyldiphenylpolysiloxane, wherein m>0 and m+n=1-5,000 units

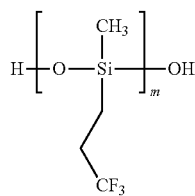

Silanol-terminated methyltrifluoropropylpolysiloxane, wherein m=1-5,000 units

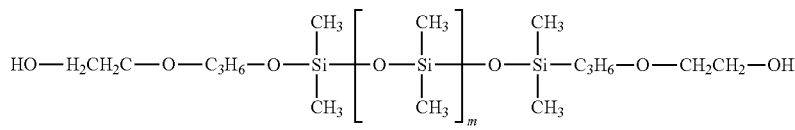

Carbinol-terminated dimethylpolysiloxane, wherein m=1-5,000 units

The boron compound can be boric oxide, boric acids, borates and boroxine. In which a borate is preferred. The borates can be simple borates, hydrolyzed, or a combination thereof. The borate compounds have a general formula of

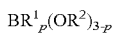

wherein p is an integer from 0-2. Preferably p is 0 or 1. $R^1$ and $R^2$ radicals independently represent alkyl, cycloalkyl, or phenyl; alkyl groups are branched or unbranched, saturated or unsaturated, and have 1-20 carbon atoms in their longest chain; cycloalkyl groups are carbocyclic, unfused, non-aromatic ring systems having a total of 5-12 rings members; each alkyl, cycloalkyl, or phenyl group may be unsubstituted or substituted with one or more substituent at any position; alkyl substituents are halo, cycloalkyl, phenyl, hydroxyl, and ether; cycloalkyl substituents are halo, alkyl, alkoxy, phenyl, and hydroxyl; and phenyl substituents are alkyl and alkoxy. Preferred examples include $R^1$=$R^2$=methyl or ethyl, $R^1$=phenyl and $R^2$=methyl or ethyl.

The polymerization reactions between hydroxyl-containing organopolysiloxanes and boron-containing compounds are typically conducted by heating a mixture thereof, for example, at temperatures of up to 200° C. for different periods of time. The weight ratio between hydroxyl-containing organopolysiloxanes and boron-containing compounds for the polymerization ranges from 10,000 to 0.1, preferably 500 to 5.

The resultant dynamic covalent organopolysiloxanes can have linear, branched, or cross-linked structures. The dynamic covalent organopolysiloxanes used in the composition ranges from about 1 to 70 wt %, preferably from about 10 to 50 wt %, and more preferably from about 15 to 30 wt %.

In another embodiment, when reaction ingredient (c) is a dilatant material, the dilatant material may include polyboroorganosiloxane and other similar compounds where boron is substituted for aluminum or titanium atoms. Other materials with similar dilatant properties may also be used. The dilatant material used in the composition ranges from about 1 to 70 wt. %, preferably from about 10 to 50 wt. %, and more preferably from about 15 to 30% wt. %.

For reaction ingredient (d), the metal complex catalyst may include the following metals: platinum (Pt), ruthenium (Ru), rhodium (Rh), palladium (Pd), iridium (Ir), and combinations thereof. The preferred metal complex catalyst includes Pt. Preferred Pt complexes are Karstedt's catalyst and Speier's catalyst. The catalyst is present in an amount that is catalytically effective as determined by a person having ordinary skill in the art.

For the metal complex catalyst, the amount of catalyst present in the curable composition based on the metal content alone ranges from about 0.5 ppm to 500 ppm, preferably from about 1 ppm to 100 ppm, and more preferably from about 5 ppm to 30 ppm.

The reaction ingredients may further include fillers and treating agents. Examples of fillers include, but are not limited to, silicon dioxide fillers such as fumed silica, precipitated silica, crystalline quartz, colloidal silica, and diatomaceous earth; carbon fillers such as carbon black, carbon fiber, carbon nanotubes, graphite, graphene, and reduced graphite oxides; metal oxides such as titanium dioxide, aluminum oxide, iron oxide, zinc oxide, and indium tin oxide; metals such as silver and gold; calcium carbonate; glass or plastic microballoons; and boron nitride.

The fillers can be pre-treated or in-situ treated with treating agents such as silazanes (hexamethyldisilazane, divinyltetramethyldisilazane, etc.), cyclic silazanes (dimethylcyclicsilazane, 1,3,5,7-tetravinyl-1,3,5,7-tetramethylcyclotetrasilazane, etc.), chlorosilanes (trimethylchlorosilane, dimethyldichlrosilane, dimethylvinylsilane, etc.), and low molecular weight silicone fluids (octamethylcyclotetrasiloxane, decamethylcyclopentasiloxane, etc.).

Fillers used in the composition can range from about 0 to 80 wt %, preferably from about 5 to 50 wt. %, and more preferably from about 10 to 40 wt. %.

The amount of treating agents is determined by the amount of fillers and filler's surface areas. The range can be from about 0 to 30 wt. %, preferably from about 0.1 to 20 wt. %, and more preferably from about 0.5 to 10 wt. %.

The reaction ingredients may also include blowing agents, surfactants, or combinations thereof. Compounds which generate a gas when used in the composition of this invention, or compounds which volatilize to a gaseous state when used in the composition of the present invention, can be incorporated in the reaction mixture as blowing agents. The blowing agents may rapidly generate gas during curing to form a porous foam structure. Examples of blowing agents include, but are not limited to, silanols and alcohols. Alcohols can be mono-alcohols such as butanol and octanol or polyols such as butanediol, pentanediol, and heptanediol.

Suitable surfactants include, but are not limited to, silicone polyethers functionalized with polyalkylene oxides (polyethylene oxide and/or polypropylene oxide).

Based on the total weight of the composition, blowing agents can be present in the composition in an amount ranging from about 0.01 to 20 wt. %, preferably from about 0.1 to 10 wt. %, and more preferably from about 1 to 5 wt. %.

Surfactants used in the composition can be present from about 0.001 to 10 wt. %, preferably from about 0.01 to 5 wt. %, and more preferably from about 0.1 to 3 wt. %.

Catalyst inhibitors may also be included in the curable composition. A catalyst inhibitor is used to slow the crosslinking and therefore adjust the time required for processing. Catalyst inhibitors are well known in the art. Typical inhibitors include, but are not limited to, organic amines (e.g. pyridine), diesters of dicarboxylic acids (e.g., alkylated maleates), organic phosphines and phosphites, acetylenic alcohols (e.g., 1-ethynyl-1-cyclohexanol, 2-methyl-3-Butyn-2-ol), and alkenyl substituted cyclic siloxanes (e.g., tetramethyltetravinyltetrasilxoane).

The inhibitor or a combination of inhibitors is added into the composition by weight between about 0 and 30,000 ppm, preferably from about 10 to 5,000 ppm, and more preferably from about 30 to 3000 ppm.

In the present description, the term "consisting essentially of" means that the curable oganosiloxane composition only contains reaction ingredients (a) through (d) and optionally, fillers, treating agents, catalyst inhibitors, blowing agents, and surfactants as described above, and excipients. Excipients are ingredients that would not materially affect the physical properties of the cured silicone rubber such as dyes, colorants, fragrances, etc.

In one embodiment, the reaction ingredients do not contain a softening agent. Softening agents are chemical substances that can open a boron bridge and include, but are not limited to, water, alcohols, polyols, silanols, and carboxylic acids.

In another embodiment, the alkenyl-containing organopolysiloxanes and hydride-containing organopolysiloxanes are not silanol-terminated. Silanol groups are silicon atoms bonded to a hydroxide.

In another embodiment, the curable composition does not contain any one of an adhesion promoter such as one containing an epoxy-functional compound; a hydroxyl-functional compound comprising at least one hydroxyl group and in the same molecule at least one alkenyl group; a tetraalkylorthosilicate; organotitanate; or an aluminum compound or a zirconium compound.

Another aspect of the invention relates to a method of making a silicone rubber composition including the steps of combining reaction ingredients (a) through (d) to form a mixture then curing the mixture under conditions sufficient to form a silicone rubber composition. The method involves crosslinking by metal complex-catalyzed (preferably, Pt-catalyzed) addition curing. Prior to curing, the mixture may be placed in a mold to effectuate a particular shape.

The curing conditions are readily determined by a person skilled in the art. For example, elevated temperatures would reduce curing time. The curing temperature may be in the range of room temperature to about 200° C., preferably 70° C. to about 150° C. Another preferred curing temperature range is about 70° C. to about 100° C. Curing could also take place at lower temperatures than the preferred ranges but would require a longer time to cure. A post-cure procedure could also be applied to the shaped article.

Another aspect of the invention relates to a shaped article including the cured silicone rubber composition described above.

EXAMPLES

The following examples are intended to illustrate some embodiments of the invention and should not be interpreted as limiting examples. All parts and percentages in the examples are by weight; and viscosities were measured at 25° C. Shore hardness was measured by a type 00 durometer (PTC Model 411).

Preparation of Dynamic Covalent Organopolysiloxanes

Example 1. Dynamic Covalent Polydimethylsiloxane A

Into a 3.0 L 4 neck flask equipped with an air-driven stirrer, thermocouple, heating mantel, condenser and a Barrett trap, 1500 g of silanol-terminated polydimethylsiloxane (PDMS) with a viscosity of 750 cP and 19.2 g of triethyl borate were charged under $N_2$ purging. The mixture was stirred without heating for 1 h and then with heating at 75° C. for 1 h and then 125° C. for 2 h. Ethanol generated from the reaction was collected into the Barret trap. The resulting polymer was clear and had a viscosity of 35,000 cP.

Example 2. Dynamic Covalent Polydimethylsiloxane B

Into a 3.0 L 4 neck flask equipped with an air-driven stirrer, thermocouple, heating mantel, condenser and a Barrett trap, 1500 g of silanol-terminated PDMS with a viscosity of 3500 cP and 2.5 g of triethyl borate were charged under $N_2$ purging. The mixture was stirred without heating for 1 h and then with heating at 75° C. for 1 h and then 125° C. for 2 h. Ethanol generated from the reaction was collected into the Barrett trap. The resulting polymer was clear and had a viscosity of 65,000 cP.

Preparation of Curable Silicone Composition Containing Dynamic Covalent Polysiloxanes

Comparative Example

A comparative example was prepared by using a standard Nusil product MED 4901 which is a polydimethylsiloxane-based addition cure liquid silicone rubber. 50 g of MED 4901 Part-A and 50 g of MED 4901 Part-B were combined into homogeneity by a Flack Teck DAC-400 mixer at 3500 rpm. The mixed composition was poured into a 2 inch diameter×0.25 inch thick mold cavity, and then compression cured in a press at 150° C. for 5 min.

Example 3: Curable Dimethyl Silicone Composition Containing 10 wt % Dynamic Covalent Polydimethylsiloxane A 45 g of MED 4901 Part-A, 45 g of MED 4901 Part-B from NuSil and 10 g of dynamic covalent polydimethylsiloxane A were combined into homogeneity by a Flack Teck DAC-400 mixer at 3500 rpm. The mixed composition was poured into a 2 inch diameter×0.25 inch thick mold cavity, and then compression cured in a press at 150° C. for 5 min. A silicone rubber containing 10 wt % dynamic covalent polysiloxane A was formed.

Example 4: Curable Dimethyl Silicone Composition Containing 20 wt % Dynamic Covalent Polydimethylsiloxane A 40 g of MED 4901 Part-A, 40 g of MED 4901 Part-B and 20 g of dynamic covalent polydimethylsiloxane A were combined into homogeneity by a Flack Teck DAC-400 mixer at 3500 rpm. The mixed composition was poured into a 2 inch diameter×0.25 inch thick mold cavity, and then compression cured in a press at 150° C. for 5 min. A silicone rubber containing 20 wt % dynamic covalent polysiloxane A was formed.

Example 5: Curable Dimethyl Silicone Composition Containing 10 wt % Dynamic Covalent Polydimethylsiloxane B 45 g of MED 4901 Part-A, 45 g of MED 4901 Part-B and 10 g of dynamic covalent polydimethylsiloxane B were combined into homogeneity by a Flack Teck DAC-400 mixer at 3500 rpm. The mixed composition was poured into a 2 inch diameter×0.25 inch thick mold cavity, and then compression cured in a press at 150° C. for 5 min. A silicone rubber containing 10 wt % dynamic covalent polysiloxane B was formed.

Example 6: Curable Dimethyl Silicone Composition Containing 20 wt % Dynamic Covalent Polydimethylsiloxane B 40 g of MED 4901 Part-A, 40 g of MED 4901 Part-B and 20 g of dynamic covalent polydimethylsiloxane B were combined into homogeneity by a Flack Teck DAC-400 mixer at 3500 rpm. The mixed composition was poured into a 2 inch diameter×0.25 inch thick mold cavity, and then compression cured in a press at 150° C. for 5 min. A silicone rubber containing 20 wt % dynamic covalent polysiloxane B was formed.

Curable dimethyl silicone compositions containing dynamic covalent polysiloxane described in examples 3 to 6 were tested for Type 00 durometer hardness over different time scales to illustrate the adaptive viscoelastic behavior derived from dynamic covalent polysiloxanes when compared against control sample MED 4901. The hardnesses of these samples is shown in FIG. 1. Without the addition of dynamic covalent polysiloxane, MED 4901 showed almost the same shore 00 hardness regardless of the measurement recorded at different dwell times. For the Examples with addition of dynamic covalent polysiloxanes (Examples 3-6), the Shore 00 hardness, when recorded at different dwell times, decreases significantly. Greater decrease was observed when a higher amount of dynamic covalent polysilxoane was added. The results demonstrated that Examples 3-6 were able to relax when the force form the hardness measurement was applied, and showed the adaptive viscoelasticity, according to the invention, due to the incorporation of dynamic covalent polysiloxane.

FIG. 1 and Table 1 below summarize the Shore 00 durometer hardness at t=1, 30, and 60 seconds dwell time, respectively.

TABLE 1

| | Type OO Durometer Hardness | | |
| --- | --- | --- | --- |
| Description | 1 second dwell time | 30 second dwell time | 60 second dwell time |
| Control - MED4901 | 49 | 48 | 48 |
| Example-3 | 47 | 42 | 40 |
| Example-4 | 41 | 34 | 32 |
| Example-5 | 45 | 40 | 39 |
| Example-6 | 35 | 30 | 29 |

Example 7: Curable Diphenyl Silicone Composition Containing Dynamic Covalent Polydimethylsiloxane A diphenyl silicone base was first prepared by mixing 100 g of dimethylvinylsiloxy-endblocked polydimethyldiphenylsiloxane with a diphenyl mole percentage of 5% and viscosity of 25 k cP and 30 g of trimethyl silyl treated fume silica (surface area of 200 m$^2$/g) into homogeneity by a Flack Teck DAC-400 mixer. A first "Part A" was then produced by mixing 50 g of the diphenyl silicone base, 20 g of dynamic covalent polydimethylsiloxane A, 0.05 g of Karstedt catalyst containing 2.4 wt % platinum by the mixer. A second "Part B" was produced by mixing 50 g of the diphenyl silicone base and 0.5 g of a methylhydrogen polysiloxane (10-45 cSt). The curing of composition involves blending 50 g of Part A and 50 g of Part B by a Flack Teck DAC-400 mixer. The mixed composition was poured into a 2 inch diameter×0.25 inch thick mold cavity, and then compression cured in a press at 150° C. for 5 min. A diphenyl silicone rubber containing dynamic covalent polysiloxane was formed.

Example 8: Curable Fluorosilicone Composition Containing Dynamic Covalent Polydimethylsiloxane A fluorosilicone base was first prepared by mixing 100 g of dimethylvinylsiloxy-endblocked polymethyltrifluoropropylsiloxane with a viscosity of 50 k cP, 23 g of hexamethyldisilazane-treated precipitated silica (surface area=170 m2/g, diameter=13 μm) into homogeneity by a Flack Teck DAC-400 mixer. A first mixture "Part A" was then produced by mixing 50 g of the fluorosilicone base, 20 g of dynamic covalent polydimethylsiloxane A, 0.05 g of Karstedt catalyst containing 2.4 wt % platinum by the mixer, and 0.1 g of vinylmethylcyclotetrasiloxane. A second mixture "Part B" was produced by mixing 50 g of the fluorosilicone base and 1.5 g of polymethylhydrogen-methyltrifluoropropylsiloxane (2-20 cSt). The curing of composition involves blending 50 g of Part A and 50 g of Part B by a Flack Teck DAC-400 mixer. The mixed composition was poured into a 2 inch diameter×0.25 inch thick mold cavity, and then compression cured in a press at 150° C. for 5 min. A fluorosilicone rubber containing dynamic covalent polysiloxane was formed.

Example 9: Curable Silicone Foam Composition Containing Dynamic Covalent Polydimethylsiloxane A A dimethyl silicone base was first prepared by mixing 100 g of dimethylvinylsiloxy-endblocked dimethylpolysiloxane (viscosity:15 k cP), 20 g of quartz powder with average particle diameter of 2 microns, and 15 g of trimethyl silyl treated fume silica (surface area of 200 m²/g) into homogeneity by a Flack Teck DAC-400 mixer. A first "Part A" was then produced by mixing 50 g of the silicone base, 20 g of dynamic covalent polydimethylsiloxane A, 3.0 g of a pentanediol, and 0.05 g of Karstedt catalyst containing 2.4 wt % platinum by the mixer. A second "Part B" was produced by mixing 50 g of the silicone base and 2 g of a methylhydrogen polysiloxane (10-45 cSt). The curing of composition involves blending 50 g of Part A and 50 g of Part B by a Flack Teck DAC-400 mixer, poured into a sheet mold, and then cured in an oven at 80° C. for 10 min. A silicone foam containing dynamic covalent polysiloxane was formed.

We claim:

1. A curable organopolysiloxane composition containing dynamic covalent organopolysiloxanes which yields, upon cure, a silicone having adaptive elastomeric and viscous characteristics, the curable organopolysiloxane composition comprising:
   (a) alkenyl-containing organopolysiloxanes having an average of at least two alkenyl radicals per molecule;
   (b) hydride-containing organopolysiloxanes having an average of at least two silicon-bonded hydrogen atoms per molecule;
   (c) a dynamic covalent organopolysiloxane, wherein the dynamic covalent organopolysiloxane is an organopolysiloxane having dynamic covalent bonds; and
   (d) a metal complex catalyst.

2. The curable organopolysiloxane composition of claim 1, wherein the alkenyl-containing organopolysiloxanes and hydride-containing organopolysiloxanes independently comprise a total of 1-10,000 units of formulas I, II, and III below:

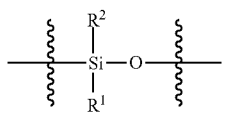

formula I

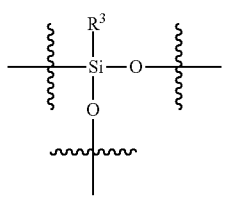

formula II

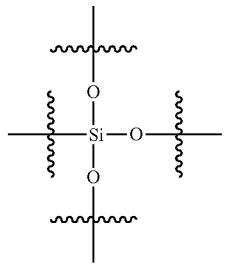

formula III wherein,
  $R^1$, $R^2$, and $R^3$ independently represent alkyl, cycloalkyl, or phenyl;
  alkyl groups are branched or unbranched, saturated or unsaturated, and have 1-12 carbon atoms in their longest chain;
  cycloalkyl groups are carbocyclic, unfused, non-aromatic ring systems having a total of 5-12 rings members;
  each alkyl, cycloalkyl, or phenyl group may be unsubstituted or substituted with one or more substituent at any position;
  alkyl substituents are halo, cycloalkyl, phenyl, hydroxyl, and ether;
  cycloalkyl substituents are halo, alkyl, alkoxy, phenyl, and hydroxyl; and
  phenyl substituents are alkyl and alkoxy.

3. The curable organopolysiloxane composition of claim 1, wherein the alkenyl-containing organopolysiloxanes are alkenyl-terminated organopolysiloxanes, alkenyl-pendant organopolysiloxanes, or combinations thereof.

4. The curable organopolysiloxane composition of claim 1, wherein the hydride-containing organopolysiloxanes are hydride-terminated organopolysiloxanes, hydride-pendant organopolysiloxanes, or combinations thereof.

5. The curable organopolysiloxane composition of claim 1, wherein the dynamic covalent organopolysiloxanes comprise imines, acyl hydrazones, boronate esters, alkoxy amines, and combinations thereof.

6. The curable organopolysiloxane composition of claim 5, wherein the dynamic covalent organopolysiloxanes are boronate esters.

7. The curable organopolysiloxane composition of claim 1, wherein the metal complex catalyst is selected from the group consisting of platinum (Pt), ruthenium (Ru), rhodium (Rh), palladium (Pd), iridium (Jr), and combinations thereof.

8. The curable organopolysiloxane composition of claim 1, wherein the metal complex catalyst is a Pt complex catalyst.

9. The curable organopolysiloxane composition of claim 8, wherein the Pt complex catalyst is Karstedt's catalyst or Speier's catalyst.

10. The curable organopolysiloxane composition of claim 1, wherein the composition further comprises fillers and treating agents.

11. The curable organopolysiloxane composition of claim 1, wherein the composition further comprises blowing agents, surfactants, or combinations thereof.

12. The curable organopolysiloxane composition of claim 1, wherein the alkenyl-containing organopolysiloxanes and hydride-containing organopolysiloxanes are not silanol-terminated.

13. A method of making a silicone rubber composition comprising the steps of:
   combining (a) alkenyl-containing organopolysiloxanes having an average of at least two alkenyl radicals per molecule; (b) hydride-containing organopolysiloxanes having an average of at least two silicon-bonded hydrogen atoms per molecule; (c) a dynamic covalent organopolysiloxane, wherein the dynamic covalent organopolysiloxane is an organopolysiloxane having dynamic covalent bonds; and (d) a metal complex catalyst to form a mixture; and
   curing the mixture under conditions sufficient to form a silicone rubber composition.

14. The method of claim 13, wherein the preferred curing temperature is about 70° C. to about 150° C.

15. The method of claim 13, wherein the dynamic covalent organopolysiloxanes comprise imines, acyl hydrazones, boronate esters, alkoxy amines, and combinations thereof.

16. The method of claim 13, wherein the metal complex catalyst is selected from the group consisting of platinum (Pt), ruthenium (Ru), rhodium (Rh), palladium (Pd), iridium (Jr), and combinations thereof.

17. The method of claim 13, wherein the metal complex catalyst is a Pt complex catalyst.

18. The method of claim 17, wherein the Pt complex catalyst is Karstedt's catalyst or Speier's catalyst.

19. The method of claim 13, wherein fillers and treating agents are added to the mixture during the combining step.

20. The method of claim 13, wherein blowing agents, surfactants, or combinations thereof are added to the mixture during the combining step.

21. The method of claim 13, further comprising, prior to the curing step, the step of placing the mixture into a mold.

22. A shaped article comprising a cured silicone rubber composition comprising the reaction product of:
   (a) alkenyl-containing organopolysiloxanes having an average of at least two alkenyl radicals per molecule;
   (b) hydride-containing organopolysiloxanes having an average of at least two silicon-bonded hydrogen atoms per molecule;
   (c) a dynamic covalent organopolysiloxane, wherein the dynamic covalent organopolysiloxane is an organopolysiloxane having dynamic covalent bonds; and
   (d) a metal complex catalyst;
   wherein:
   the alkenyl-containing organopolysiloxanes and hydride-containing organopolysiloxanes independently comprise a total of 1-10.000 units of formulas I, II, and III below:

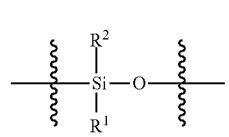

formula I

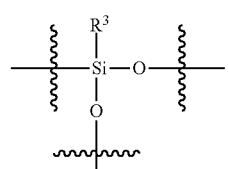

formula II

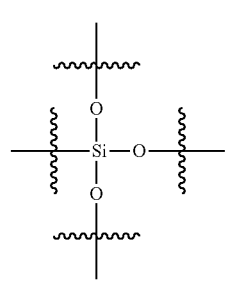

formula III wherein, $R^1$, $R^2$, and $R^3$ independently represent alkyl, cycloalkyl, or phenyl;

alkyl groups are branched or unbranched, saturated or unsaturated, and have 1-12 carbon atoms in their longest chain;

cycloalkyl groups are carbocyclic, unfused, non-aromatic ring systems having a total of 5-12 rings members;

each alkyl, cycloalkyl, or phenyl group may be unsubstituted or substituted with one or more substituent at any position;

alkyl substituents are halo, cycloalkyl, phenyl, hydroxyl, and ether;

cycloalkyl substituents are halo, alkyl, alkoxy, phenyl, and hydroxyl; and phenyl substituents are alkyl and alkoxy.

* * * * *

UNITED STATES PATENT AND TRADEMARK OFFICE
CERTIFICATE OF CORRECTION

PATENT NO. : 10,961,391 B2
APPLICATION NO. : 16/628872
DATED : March 30, 2021
INVENTOR(S) : Liu et al.

Page 1 of 1

It is certified that error appears in the above-identified patent and that said Letters Patent is hereby corrected as shown below:

In the Claims

Column 16, Claim 7, Line 51:　　　　　　　　now reads "iridium (Jr)," should read --iridium (Ir),--

Column 17, Claim 16, Lines 20 and 21:　　　now reads "iridium (Jr)," should read --iridium (Ir),--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*